(12) United States Patent
Webber

(10) Patent No.: US 8,572,619 B2
(45) Date of Patent: Oct. 29, 2013

(54) SYSTEM AND METHOD FOR INTEGRATING SOFTWARE SCHEDULERS AND HARDWARE INTERRUPTS FOR A DETERMINISTIC SYSTEM

(75) Inventor: Victor Webber, Los Altos Hills, CA (US)

(73) Assignee: Real Time, Inc., Los Altos Hills, CA (US)

(*) Notice: Subject to any disclaimer, the term of this patent is extended or adjusted under 35 U.S.C. 154(b) by 182 days.

(21) Appl. No.: 12/931,262

(22) Filed: Jan. 27, 2011

(65) Prior Publication Data

US 2011/0185362 A1 Jul. 28, 2011

Related U.S. Application Data

(60) Provisional application No. 61/336,967, filed on Jan. 28, 2010.

(51) Int. Cl.
*G06F 9/455* (2006.01)
*G06F 9/46* (2006.01)

(52) U.S. Cl.
USPC .......................... 718/103; 718/104; 718/108

(58) Field of Classification Search
None
See application file for complete search history.

(56) References Cited

U.S. PATENT DOCUMENTS

| 6,085,215 | A  | * | 7/2000 | Ramakrishnan et al. | 718/102 |
| 6,263,359 | B1 | * | 7/2001 | Fong et al. | 718/103 |
| 2002/0120663 | A1 | * | 8/2002 | Binns | 709/103 |
| 2006/0248317 | A1 | * | 11/2006 | Vorbach et al. | 712/221 |

* cited by examiner

*Primary Examiner* — Jennifer To
*Assistant Examiner* — Bradley Teets

(57) ABSTRACT

The problem which is being addressed by this invention is the lack of determinism in mass market operating systems. This invention provides a mechanism for mass market operating systems running on mass market hardware to be extended to create a true deterministic responsive environment. This is accomplished through programming hardware elements of the scheduler to behave deterministically with respect to the software scheduler.

2 Claims, 3 Drawing Sheets

SYSTEM AND METHOD FOR INTEGRATING SOFTWARE SCHEDULERS AND HARDWARE INTERRUPTS FOR A DETERMINISTIC SYSTEM

CROSS-REFERENCE TO THE RELATED APPLICATIONS

This is a utility application which claims the priority benefit of the U.S. provisional application No. 61,336,967 filed on Jan. 28, 2010.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

BACKGROUND OF INVENTION

The problem which is being addressed by this invention is the lack of determinism in mass market operating systems. This invention provides a mechanism for mass market operating systems running on mass market hardware to be extended to create a true deterministic responsive environment.

BRIEF SUMMARY OF INVENTION

The problem which is being addressed by this invention is the lack of determinism in mass market operating systems. This invention provides a mechanism for mass market operating systems running on mass market hardware to be extended to create a true deterministic responsive environment.

This is accomplished through programming hardware elements of the scheduler to behave deterministically with respect to the software scheduler.

DETAILED DESCRIPTION OF THE INVENTION

Figure 1:
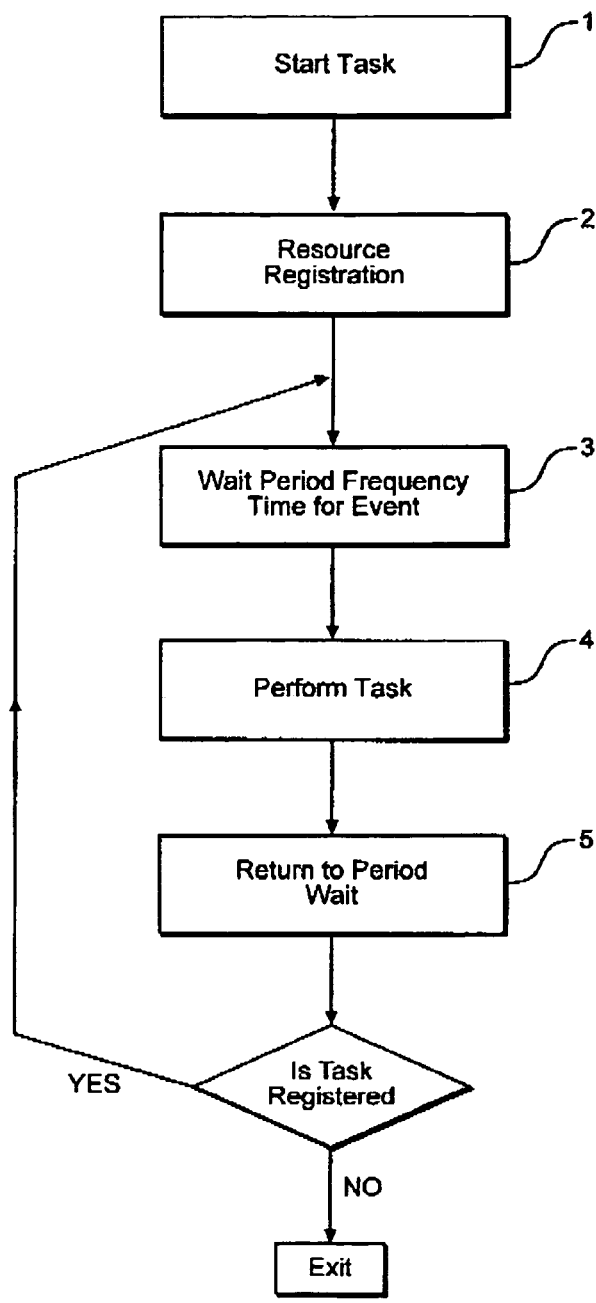
FIG. 1 is a flowchart of the standard task involved in processing service requests.

Processing power of commodity hardware (PCs) running general purpose mass market operating systems is vastly underutilized with respect to real-time applications. Even some embedded hardware running off-the-shelf "real-time" operating systems are underutilized. An average PC has power to simultaneously run 10 real-time apps, but generally can't run more than 2 because of a poor real-time environment.

The problem of underutilized real-time power is ubiquitous. The problem is as widespread as PCs running general purpose operating systems are widespread. For example, the business workstation user, home user, factory automation user, medical industry user, and the portable devices user all have this problem.

The existing solutions are incomplete. They create another programming environment hence require a new set of skills for programming, and they don't fully leverage the computational power of the hardware in that they are more real-time on-the-side solutions. One example of this is when not all interrupts are incorporated in the stable task set. Consequences of on-the-side solutions is that not all computational power can be leveraged for real-time applications. Most detrimental is that computational requirements (wattage) for the entire system cannot be calculated so that CPU cycles cannot be throttled back to minimize power consumption This invention is unique because it allows for all computations in the stable task set. For example, interrupt service routines are periods in the stable task set, deferred processing routines are periods in the stable task set, standard tasks are periods in the stable task set and periodic tasks from different schedulers are aggregated into a single stable task set. Additional new programming is limited to a registration procedure for submitting and withdrawing a task from the stable task set. All latencies including interrupts off times and task periods and higher priority entities are accounted for to quantify and harden response times to the point of true determinism.

The advantages of this approach is that it is legacy compatible, it needs only a small amount of programming to fold a system into stable task sets, it utilizes all CPU cycles, and it allows for absolute minimal use of power by always knowing how far back the CPU frequency can be throttled. Also it provides for deterministic back-up times with real-time file systems, bounded search times with real-time data bases, and more security, and time based authentication and authorization tokens.

The advantages in factory automation are that a single PC based node can run a full real-time network stack while performing real-time data acquisition and performing real-time process control, implement software only real-time publish-subscribe networks, implement software only ATM adaptation layer and above, and implement tightly coupled networked clusters synchronized on a nanosecond basis.

The advantage in tightly coupled process control networks is that it involves calibration of NIC and all transmission protocols. Events can be scheduled on different nodes to within a microsecond accuracy both absolutely and relatively. This has application in aircraft control, robotics, and factory automation, etc.

The advantage in portable devices is that notable power savings can be achieved by knowing how far back the CPU frequency can be throttled.

RTI advantage over competitors: the RTI library is the only solution with the ability to incorporate ALL computation into a stable task set.

This invention solves the problems associated with calculating the periods of the stable task set, with calculating the task latency, and with calculating the interrupt latency.

Period calculations for a stable task set element can be done by making several assumptions. The largest most important factor is the external timing requirement which is imposed as a function of each individual project. In conjunction with this there exist a worst case hardware response and a worst case program flow which must be taken into account.

The worst case hardware response time is calculated by establishing indication latencies through hardware timing information.

The worst case program flow is calculated by aggregating any exceptions which might occur during the flow and including the deepest nest of loops and recursion.

Biased Worse Case Calculation $$\frac{E_1}{P_1} \ldots \frac{E_n}{P_n} \leq n\left(2^{\frac{1}{n}} - 1\right) + C$$

E: execution time
P: period of execution
C: constant based on assumptions

As shown in FIG. 1 the standard task starts normally 1. However, the deterministic algorithm is immediately implemented with the resource registration 2. Each task must register its time of execution and period (processor percentage) with the OS, and OS must keep accounts for all real-time tasks.

Each task must negotiate permission for its computational requirements, each task must include resource usage in its period (except for periodic servers), and each task must deregister its requirements when they are no longer needed. This deregistration is done when the task exits 5.

Resource time accounting is done by assessing all resource calls which are either synchronous with a time impact on its originating stable task set element, or asynchronous with a binding to another task. All resource calls, even when synchronous, are associated with a periodic server, all periodic servers are represented in a device node tree. The device node tree serves as the database for the negotiation which takes place at task registration time and informs the metadata. These resource calls make up the perform task 4 portion of the activity. This periodic task performance is scheduled when the task does a wait period frequency time for event 3. A check is done after every iteration to check if the perform task 4 needs to be done again.

Figure 2:
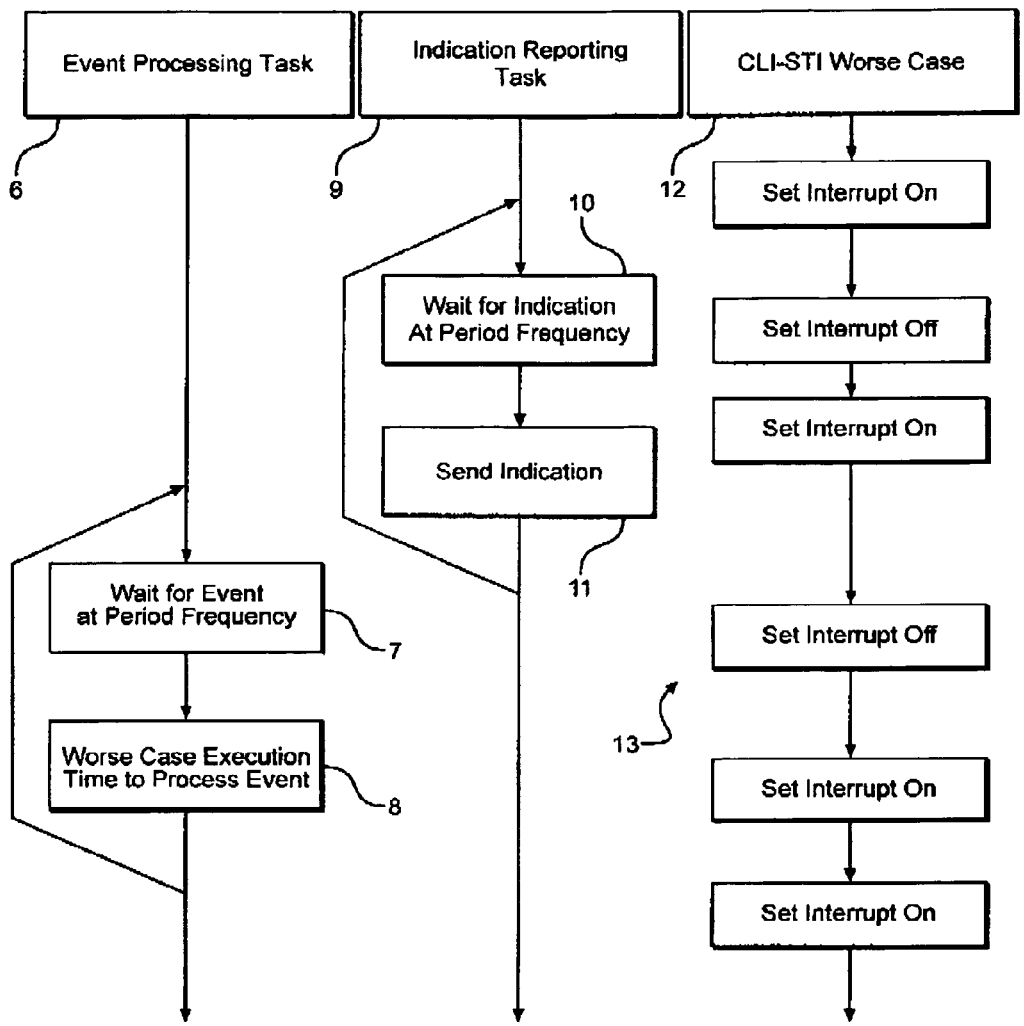
FIG. 2 depicts sequence diagrams for all the tasks involved in the cascaded processing of an event.

As shown in FIG. 2 latency calculations aggregate the worst case for all contributing factors. Some factors are contained in the event processing task 6. Here the scheduling wait 7 and the event processing 8 are assumed to contribute to the worst case for the event processing task. Also, in the indication reporting task 9, the deferred activities of indication waiting 10 and sending the indication 11 contribute to the worst case calculation. The finest granularity of the indication reporting latency is aggregated into the CLI (CLear Interrupt bit) and STI (SeT Interrupt) worst case assembler instructions. This task sums the time durations 13 when interrupts are on and off.

Figure 3:
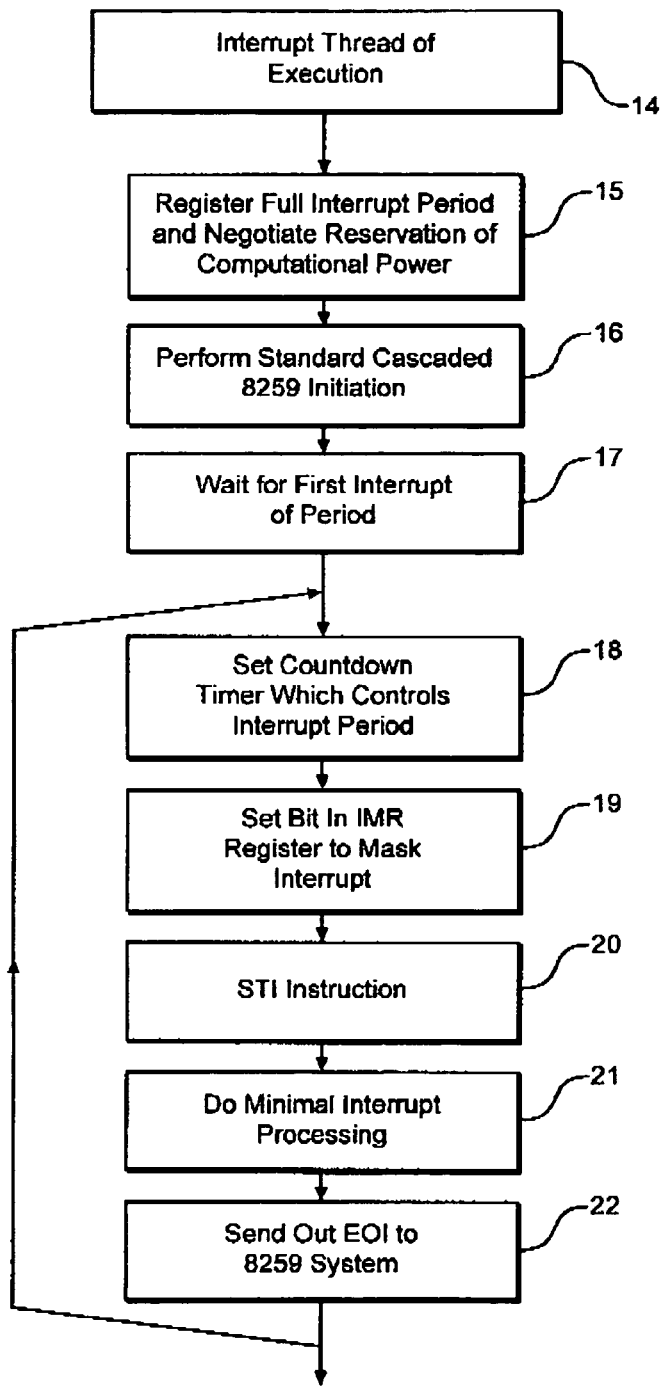
FIG. 3 is a sequence diagram of the detailed actions involved in deterministically processing of an event or interrupt.

As shown in FIG. 3 the interrupt calculations register the worst case requirements for device interrupts as gathered by the Interrupt thread of execution 14. Initially, the full interrupt period is registered and the 8259 or Advanced Programmable Interrupt Controller (APIC) initialization is done 15, 16. This is pursuant to keeping interrupts unmasked in anticipation of initial interrupt to start full processing. Full processing involves throttling the interrupt with masks to achieve the designated period.

Full interrupt processing creates a stable task set using the cascaded 8259 (APIC) scheduling system. Period will be the predetermined ISR frequency which fully satisfies the device. Execution time is the 8259 (APIC) administrative work and the interrupt processing 17, 21. The period processing requirements can be registered and deregistered in the stable task set 18, 19, 20, 22.

During the interrupt period the task must control CPU response to the interrupt request signal. This requires that the signal in interrupt request register of the APIC be masked. Unmasking from a high frequency device and optimization for the 8259 (APIC) to establish period by deterministic is appropriate.

The deferred processing periods are similar to the interrupt period as they can be an aggregation of interrupts or deferred processing periods, they both assume arbitrary thread context, and they both can be analyzed as a stable task set.

The summation of stable task sets includes all the stable task sets of different schedulers. All stable task sets must be on the same processor. The stable task sets must account for all tasks on the system of equal or greater priority, stable task sets must account for all other stable task sets on the processor, and stable task set summation is used in the negotiations during task registration.

Stable Task Set Summation Formula—Interrupt Periods $$\frac{E_1}{P_1} \ldots \frac{E_n}{P_n} \leq n\left(2^{\frac{1}{n}} - 1\right) + C_{8259Scheduler} \leq S_{8259Scheduler}$$

$C_{8259Scheduler}$: constant to account for scheduler specifics
$S_{8259Scheduler}$: summarized stable task set for 8259 scheduler Stable Task Set Summation Formula—Interrupt Periods and Deferred Processing Periods:

$$\frac{E_1}{P_1} \ldots \frac{E_n}{P_n} \leq n\left(2^{\frac{1}{n}} - 1\right) + C_{deferred} \leq S_{8259Scheduler} + S_{deferred}$$

$C_{deferred}$: constant to account for scheduler specifics
$S_{deferred}$: summarized stable task set for deferred scheduler Stable Task Set Summation Formula—Interrupt Periods and Deferred Processing Periods and Standard Task Periods:

$$\frac{E_1}{P_1} \ldots \frac{E_n}{P_n} \leq n\left(2^{\frac{1}{n}} - 1\right) + C_{std} \leq S_{8259Scheduler} + S_{deferred} + S_{std}$$

$C_{std}$: constant to account for scheduler specifics
$S_{std}$: summarized stable task set for deferred scheduler The supporting tools must have all OS resources calibrated for inclusion in the task registration process, and compiler must have set of MACROs and PRAGMAs which provide worse case execution times for the task registration process.

Some ancillary benefits are that the task-queue technique generates minimal use of memory and synchronization objects, and that long duration queues create optimized processing through cache coherency.

What is claimed is:

1. A computerized method to incorporate interrupts in a stable task set for tasks scheduling comprising:
    creating a plurality of stable task sets, each of the plurality of stable task sets comprising tasks having a same priority level set and each of the tasks having a time period for executing by a processor; Wherein the tasks in the stable task set including one or more of at least one of aperiodic tasks, periodic tasks and interrupts;
wherein tasks registered to one of the stable task sets complete their respective executions within the time period allotted to that stable task set, and the tasks must register their respective resource usage requirements, within their respective periods of execution, and deregister their resource requirements when they are no longer needed; wherein interrupts register their worst case resource requirements and the interrupts are initially unmasked in anticipation of an initial interrupt;

executing all scheduled tasks in one of the stable task set during the time period allocated for executing of the stable task set;

determining that together the all scheduled tasks in the one of the stable task set consume less than a total resources of the processor; and determining a constant value associated with resources overhead used due to context switching between the tasks or instructions that enabling or disabling interrupts during the time period of execution of the stable task set, wherein the interrupts using the worst case resource requirements;

checking whether the consume resources and the constant value are less than or equal to the total resources of the processor; and scheduling one of the stable task set having a highest priority among the plurality of stable task and having the checking step result that the consume resources and the constant value are less than or equal to the total resources of the processor.

2. The method of claim 1, wherein the plurality of the stable task sets include cascaded priority stable task sets integrate an activity of a lower priority level tasks into a next higher priority level task.

\* \* \* \* \*